United States Patent
Diethelm et al.

(10) Patent No.: US 10,297,849 B2
(45) Date of Patent: May 21, 2019

(54) METHOD AND SYSTEM FOR PRODUCING CARBON DIOXIDE, PURIFIED HYDROGEN AND ELECTRICITY FROM A REFORMED PROCESS GAS FEED

(71) Applicant: EZ-Energies GmbH, Augsburg (DE)

(72) Inventors: Stefan Diethelm, Romont (CH); Alberto Ravagni, Baar (CH); Olivier Bucheli, Adligneswil (CH)

(73) Assignee: EZ-ENERGIES GMBH, Augsburg (DE)

( * ) Notice: Subject to any disclaimer, the term of this patent is extended or adjusted under 35 U.S.C. 154(b) by 0 days.

(21) Appl. No.: 15/119,866

(22) PCT Filed: Feb. 19, 2015

(86) PCT No.: PCT/EP2015/053553
§ 371 (c)(1),
(2) Date: Aug. 18, 2016

(87) PCT Pub. No.: WO2015/124700
PCT Pub. Date: Aug. 27, 2015

(65) Prior Publication Data
US 2017/0250429 A1    Aug. 31, 2017

Related U.S. Application Data

(63) Continuation-in-part of application No. PCT/EP2014/053263, filed on Feb. 19, 2014.

(51) Int. Cl.
*H01M 8/06*     (2016.01)
*H01M 8/0662*   (2016.01)
(Continued)

(52) U.S. Cl.
CPC ............ *H01M 8/0681* (2013.01); *C01B 3/16* (2013.01); *C01B 3/38* (2013.01); *C01B 3/503* (2013.01);
(Continued)

(58) Field of Classification Search
None
See application file for complete search history.

(56) References Cited

U.S. PATENT DOCUMENTS

2005/0106429 A1    5/2005  Keefer
2005/0123810 A1    6/2005  Balan
(Continued)

OTHER PUBLICATIONS

International Search Report for PCT/EP2015/053553, Completed by the European Patent Office on May 7, 2015, 4 Pages.
(Continued)

*Primary Examiner* — Wyatt P McConnell
(74) *Attorney, Agent, or Firm* — Brooks Kushman P.C.

(57) ABSTRACT

Method and system for producing CO2, purified hydrogen and electricity from a reformed process gas feed using a solid oxide fuel cell. The method having the steps of: introducing the reformed process gas into the solid oxide fuel cell; converting hydrogen and CO of the reformed process gas in combination with oxygen into an anode off-gas including steam, $CO_2$ and unconverted process gas; introducing the anode off-gas into a high temperature water gas shift reactor; in the high temperature water-gas shift reactor, converting CO and steam into $CO_2$ and hydrogen, introducing the gas exiting the high temperature water-gas shift reactor into a low temperature water-gas shift membrane reactor, in the low temperature water-gas shift membrane reactor, converting CO and steam into $CO_2$ and hydrogen, whereby the low temperature water-gas shift membrane reactor comprises a hydrogen pump producing
(Continued)

purified hydrogen on a permeate side, while removing hydrogen from a feed side.

21 Claims, 4 Drawing Sheets (51) Int. Cl.
    *H01M 8/0612*     (2016.01)
    *H01M 8/0668*     (2016.01)
    *H01M 8/04089*     (2016.01)
    *C01B 3/16*     (2006.01)
    *C01B 3/38*     (2006.01)
    *C01B 3/50*     (2006.01)
    *H01M 8/124*     (2016.01)

(52) U.S. Cl.
    CPC ..... *H01M 8/04097* (2013.01); *H01M 8/0618* (2013.01); *H01M 8/0643* (2013.01); *H01M 8/0668* (2013.01); *H01M 8/0687* (2013.01); *C01B 2203/0233* (2013.01); *C01B 2203/0288* (2013.01); *C01B 2203/041* (2013.01); *C01B 2203/0475* (2013.01); *C01B 2203/0495* (2013.01); *C01B 2203/066* (2013.01); *C01B 2203/1235* (2013.01); *H01M 2008/1293* (2013.01)

(56) References Cited

U.S. PATENT DOCUMENTS

| | | |
|---|---|---|
| 2006/0024540 A1 | 2/2006 | Laven et al. |
| 2006/0115691 A1 | 6/2006 | Hilmen et al. |
| 2009/0117024 A1 | 5/2009 | Weedon et al. |
| 2010/0047637 A1 | 2/2010 | McElroy et al. |
| 2010/0266923 A1* | 10/2010 | McElroy ................ B01D 53/22 |
| | | 429/444 |
| 2013/0071763 A1 | 3/2013 | Betts |
| 2013/0118735 A1 | 5/2013 | Jamal et al. |
| 2013/0126038 A1* | 5/2013 | Jamal ................ H01M 8/0618 |
| | | 141/5 |

OTHER PUBLICATIONS

International Search Report for PCT/EP2014/053263, Completed by the European Patent Office on Oct. 13, 2014, 4 Pages.

* cited by examiner

METHOD AND SYSTEM FOR PRODUCING CARBON DIOXIDE, PURIFIED HYDROGEN AND ELECTRICITY FROM A REFORMED PROCESS GAS FEED

CROSS-REFERENCE TO RELATED APPLICATION

This application is the U.S. national phase of PCT Application No. PCT/EP2015/053553 filed on Feb. 19, 2015, which claims priority to PCT/EP2014/053263 filed on Feb. 19, 2014, the disclosures of which are incorporated in their entirety by reference herein.

FIELD OF THE INVENTION

The field of invention relates to a method and a system for producing carbon dioxide, purified hydrogen and electricity from a reformed process gas feed using a SOFC unit.

BACKGROUND OF THE INVENTION

Enhanced Oil Recovery (EOR) is a generic term for techniques for increasing the amount of crude oil that can be extracted from an oil field. The term Enhanced Gas Recovery (EGR) is a generic term for techniques for increasing the amount of natural gas that can be extracted e.g. from a nearly depleted gas field. There currently are several different methods of Enhanced Oil Recovery including steam flood and water flood injection and hydraulic fracturing. Enhanced oil recovery extraction methods consume large quantities of water, natural gas and energy. Gas injection or miscible flooding is presently the most-commonly used approach in enhanced oil recovery. The fluid most commonly used for miscible displacement is carbon dioxide because it reduces the oil viscosity and is less expensive than liquefied petroleum gas. Carbon dioxide is particularly effective in reservoirs deeper than 600 m, where carbon dioxide will be in a supercritical state. In high pressure applications with lighter oils, carbon dioxide is miscible with the oil, with resultant swelling of the oil, and reduction in viscosity. Carbon Dioxide as a solvent has the benefit of being more economical than other similarly miscible fluids such as propane and butane.

Document US2006/0115691A1 discloses a method for exhaust gas treatment in a solid oxide fuel cell power plant with carbon dioxide capture, in which the unreacted fuel in the anode exhaust is recovered and recycled, while the resulting exhaust stream consists of highly concentrated carbon dioxide. One disadvantage of this method is that the method is less energy-efficient so that additional resources and products are needed to run the process. In addition this method is limited to a pressurized SOFC system only.

Document US2010/0266923A1 discloses a fuel cell system comprising an electrochemical hydrogen pump comprising a proton exchange membrane. A water-gas shift (WGS) reaction catalyst is incorporated within the electrochemical hydrogen pump. This embodiment allows a high rate of fuel recirculation, which means a recirculation of hydrogen, to obtain a high overall fuel utilization, which results in a high system efficiency. The hydrogen separation device is used to enrich the recirculated portion of anode exhaust stream with hydrogen by electrochemically pumping hydrogen out of the SOFC stack anode exhaust stream. Operation of such a fuel cell system allows for SOFC fuel utilization rates approaching 100%. To reach such high SOFC fuel utilization rates, the electrochemical hydrogen pump must be operated in excess of 90% utilization. This means that at least 90% of hydrogen in the SOFC stack anode exhaust stream has to be separated and recycled. Under these conditions, the SOFC system may be operated with at least 96% fuel utilization and most preferably with about 99% fuel utilization. One disadvantage of this system is that it is optimized for high fuel utilization and is therefore not suitable as a hydrogen generator with carbon dioxide capture.

Technical Problem to be Solved

The objective of the present invention is thus to provide a cheaper method and system for producing electrical power and carbon dioxide.

It is also an objective of the present invention to provide an energy-efficient method and system for producing electrical power, carbon dioxide and hydrogen, in particular clean and preferably pressurized carbon dioxide, suitable for enhanced oil recovery from a reformed process gas feed, most preferably from a hydrocarbon feed.

SUMMARY OF THE INVENTION

The above-identified objectives are solved by a method comprising the features of claim 1 and more particular by a method comprising the features of claims 2 to 10. The above-identified objectives are further solved by a system comprising the features of claim 11 and more particular by a system comprising the features of claims 12 to 20.

The objective is in particular solved by a method for producing carbon dioxide, purified hydrogen and electricity from a reformed process gas feed using a solid oxide fuel cell SOFC, the method comprising the steps of:
  introducing the reformed process gas into an anode side of the solid oxide fuel cell;
  in the solid oxide fuel cell, introducing air into a cathode side of the solid oxide fuel cell, and in the anode side converting hydrogen and carbon monoxide of the reformed process gas in combination with oxygen into an anode off-gas comprising steam, carbon dioxide and unconverted process gas;
  introducing the anode off-gas into a high temperature water gas shift reactor;
  in the high temperature water-gas shift reactor, converting carbon monoxide and steam into carbon dioxide and hydrogen,
  introducing the gas exiting the high temperature water-gas shift reactor into a low temperature water-gas shift membrane reactor,
  in the low temperature water-gas shift membrane reactor, converting carbon monoxide and steam into carbon dioxide and hydrogen, whereby the low temperature water-gas shift membrane reactor comprises a hydrogen pump that produces purified hydrogen on a permeate side, while removing hydrogen from a feed side, so that the anode off-gas is depleted of hydrogen and carbon monoxide to create a carbon dioxide rich gas stream comprising mainly carbon dioxide and steam.

The objective is further in particular solved by a system for producing carbon dioxide, purified hydrogen and electricity from a reformed process gas feed, the system comprising:
  a solid oxide fuel cell SOFC,
  a high temperature water-gas shift reactor, and a low temperature water-gas shift membrane reactor comprising a permeate side, a feed side and an electrochemical pump there between, wherein the solid oxide fuel cell is fluidly connected with the reformed process gas feed for converting the reformed process gas in combination with oxygen into an anode off-gas comprising steam, carbon dioxide and unconverted process gas;

wherein the high temperature water-gas shift reactor is fluidly connected with the solid oxide fuel cell for receiving the anode off-gas, and for converting carbon monoxide and steam into carbon dioxide and hydrogen, wherein the feed side of the low temperature water-gas shift membrane reactor is fluidly connected with the high temperature water gas shift reactor for receiving the gas exiting the high temperature water-gas shift reactor, and for converting carbon monoxide and steam into carbon dioxide and hydrogen, and for separating the hydrogen by the electrochemical pump to create a purified hydrogen on the permeate side, so that the anode off-gas is depleted of hydrogen and carbon monoxide to create a carbon dioxide rich gas stream comprising mainly carbon dioxide and steam.

The expression "a reformed process gas feed" herein refers to the output of a conversion of a fuel, for example hydrocarbon or alcohol, into another fuel usually with a higher heating value using a reforming reaction, preferentially steam reforming Steam reforming, sometimes also called Fossil fuel reforming, is a method for producing hydrogen or other useful products from carbonaceous fuels such as hydrocarbon fuels, for example natural gas. This is achieved in a processing device called a reformer which reacts steam at high temperature with the fuel so that a reformed process gas feed is produced.

The reforming of any hydrocarbon is as follows:

$$C_nH_{2n+2} + nH_2O \rightarrow nCO + (2n+1)H_2$$

Such a steam reforming can be performed for a wide range of fuels, but the process itself is similar in all cases.

The method according to the invention uses two consecutive water gas shift reactors, a high temperature water gas shift reactor and a low temperature water gas shift membrane reactor. The purpose of the high temperature water gas shift reactor is to convert carbon monoxide and steam contained in the anode off-gas into carbon dioxide and hydrogen. An embodiment of the SOFC process includes operating the high temperature water gas shift (HTS) reactor such that it maintains a temperature of about 300° C. The purpose of the low temperature water gas shift (LTS) membrane reactor is to further convert the remaining carbon monoxide and steam contained in the gas exiting the high temperature water gas shift reactor into carbon dioxide and hydrogen and to separate the hydrogen. The low temperature water gas shift membrane reactor comprises an electrochemical pump designed to suppress hydrogen on a feed side and to create purified hydrogen on a permeate side. Such a preferably PEM-based electrochemical hydrogen pump is capable of separating hydrogen from the feed side as long as the gas temperature and the carbon monoxide concentration on the feed side are not too high. In a preferred embodiment, the gas entering the feed side of the low temperature water gas shift membrane reactor contains less than 2% carbon monoxide and has a temperature of less than 200° C. The removal of hydrogen on the feed side of the low temperature water-gas shift membrane reactor allows creating purified hydrogen on the permeate side, and the removal of hydrogen improves the conversion of carbon monoxide to carbon dioxide on the feed side, so that the output on the feed side consists mostly of steam and carbon dioxide. One advantage of the method according to the invention is therefore the ability of producing carbon dioxide, purified hydrogen and electricity from a reformed process gas feed using a solid oxide fuel cell.

Preferably the solid oxide fuel cell SOFC is controlled to operate with a fuel utilization (FU) in the range of 0% to 90%, depending on a demanded amount of purified hydrogen and carbon dioxide to be produced. The fuel utilization indicates the percent of fuel that reacts in the SOFC fuel cell. For example, a fuel utilization of 50% indicates half of the hydrogen $H_2$ oxidized to $H_2O$. Most preferably the solid oxide fuel cell SOFC is controlled to operate with a fuel utilization (FU) in the range of 25% to 80%. One advantage of the method and system according to the invention is, that the fuel utilization (FU) may be varied in a broad range, so that the potential revenue from each of the three product streams, electricity, hydrogen and carbon dioxide may be controlled. Therefore the amount of electricity or hydrogen (a secondary fuel) and carbon dioxide may be controlled as required, for example by the needed amount of carbon dioxide.

The drawback of a fuel cell system optimized for high system efficiency and striving SOFC fuel utilization rates approaching 100%, as for example disclosed in Document US2010/0266923A1, is the fact, that the fuel utilization (FU) of the SOFC may only be varied in a very narrow range of for example between 96% and 100%. Lowering the fuel utilization rate is not possible because it would increase the risk of poisoning effects of the membrane catalyst of the low temperature water-gas shift membrane reactor, due to an increase of carbon monoxide, which would lead to a rapid degradation of the membrane.

In a preferred method, the system according to the invention is used for self-sufficient production of electrical power, purified hydrogen and carbon dioxide from hydrocarbon fuels. The system may therefore be operated self-sufficient by using only a source of hydrocarbon fuel. In such a use the solid oxide fuel cell SOFC generates the electric energy necessary to run the system, and thereby produces at least purified hydrogen and carbon dioxide.

Preferably the system may be operated self-sufficient, and may produce excess electrical power at a fuel utilization (FU) of more than 25%.

There are various ways for producing a reformed process gas feed suitable to be fed to the solid oxide fuel cell. Most preferably a gaseous hydrocarbon feed and steam is introduced into a reformer, wherein in the reformer the reformed process gas is generated by at least partially converting methane and steam into carbon monoxide and hydrogen. In a further preferred method liquid hydrocarbon feed is introduced into an evaporator, to generate the gaseous hydrocarbon feed which is fed to the reformer. Instead of a gaseous hydrocarbon feed, any gaseous carbonaceous fuel is suitable to be fed into the reformer. Fossil fuel, for example natural gas, is preferably pretreated in a fuel pretreatment unit to remove poisons such as sulphur compounds, before such a gaseous or liquid hydrocarbon feed is fed into the reformer.

Carbon containing material is herein also referred to as carbonaceous material or carbonaceous fuel. A carbonaceous fuel includes various fuels such as hydrocarbons ($C_mH_n$), natural gas, crude oil, biomass, biogas, alcohols, wood or coal. In a further advantageous method a carbonaceous fuel, such as a solid carbonaceous fuel, for example wood, is introduced into a gasifier, in combination with steam, to generate a product gas, wherein the product gas is introduced into a gas cleaning unit to generate the reformed process gas. The carbonaceous fuel also may be a liquid or gas fuel, for example alcohols, or biogas.

The method and system according to the invention therefore allows producing carbon dioxide, hydrogen and electricity from a reformed process gas feed.

In a further method step the purified hydrogen is added to the reformed process gas. Most preferably the purified hydrogen is added to the gaseous carbonaceous fuel feed, preferably the gaseous hydrocarbon feed, which is fed to the reformer, where it is converted by steam reforming to a mixture of $H_2$, CO, $CO_2$ and $H_2O$. This mixture enters the solid oxide fuel cell at the anode side. Oxygen in the air is transferred through the solid oxide fuel cell's electrolyte and reacts electrochemically with $H_2$ and CO, thereby generating electricity and heat. The anode off-gas is fed into the high temperature water gas shift reactor, where the water-gas shift reaction converts CO and $H_2O$ into $CO_2$ and $H_2$. The gas leaving the high temperature water gas shift reactor is fed into the low temperature water gas shift membrane reactor, where the water-gas shift reaction converts CO and $H_2O$ into $CO_2$ and $H_2$, whereby the $H_2$ is transferred through the membrane by the hydrogen pump so that the gas on the feed side of the low temperature water gas shift membrane reactor is depleted from hydrogen, and purified hydrogen is produced on the permeate side. The anode off-gas is therefore purified, so that the gas exiting the feed side of the low temperature water gas shift membrane reactor contains mostly $CO_2$ and steam.

One advantage of the method according to the invention is that hydrogen is removed from the anode-off gas of the solid oxide fuel cell, so that the CO contained in the anode-off gas is fully converted to $CO_2$. In one embodiment according to the invention hydrogen is thereby transferred to the fuel and recycled in the solid oxide fuel cell, which increases the fuel conversion and the efficiency of the solid oxide fuel cell.

In the most basic embodiment of the SOFC system according to the invention, beside the reformed process gas feed, air and steam, no additional input is needed to run the method. The reformed process gas feed is for example based on a hydrocarbon feed. The system according to the invention is very easy to handle and very convenient to run, because no expensive infrastructure and additional supply is required.

Various objects, features, aspects and advantages of the present invention will become more apparent from the following detailed description of preferred embodiments of the invention, along with the accompanying drawings in which like numerals represent like components.

DESCRIPTION OF PREFERRED EMBODIMENTS

Figure 1:
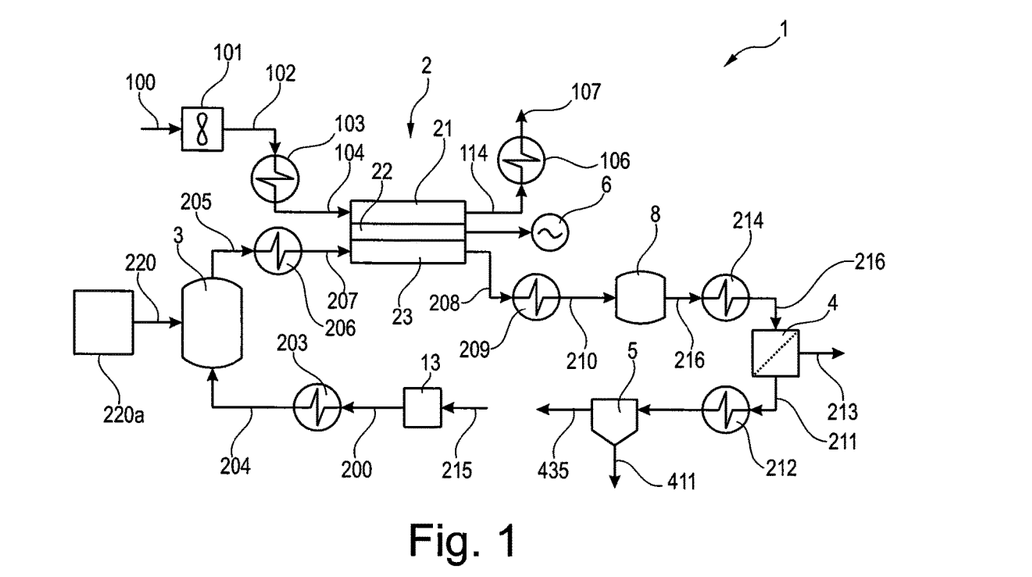
FIG. 1 shows a process flow diagram of a first embodiment of the invention.

FIG. 1 shows the main principles of the present system 1 and method for producing carbon dioxide 435, purified hydrogen 213 and electricity from a reformed process gas feed 205. Poison-free fuel containing carbon or hydrocarbon, typically biogas or natural gas 215, is fed as a carbonaceous fuel feed 200 or as a gaseous hydrocarbon feed 200 into a reformer 3 to produce the reformed process gas feed 205. The biogas or natural gas 215 is preferably entering a fuel pretreatment unit 13, which contains all necessary poison removal steps to produce a fuel that is sufficiently clean to be suitable for a reformer 3, a solid oxide fuel cell 2 and for water gas shift reactors 8 and 4. Typically the pretreatment unit 13 would at least consist of desulphurisation by one of the conventional methods known to those skilled in the art, to create the gaseous carbonaceous fuel 200 or the gaseous hydrocarbon feed 200.

As disclosed in FIG. 1, the gaseous carbonaceous fuel feed 200 or the gaseous hydrocarbon feed 200 is heated in heat exchanger 203, and fed to the reformer 3 by conduit 204, to generate reformed process gas 205, whereby in the embodiment according to FIG. 1, also steam 220 generated in a steam generating unit 220a is fed to the reformer 3. The reaction in the reformer 3 preferably takes place in the presence of a reforming catalyst in a temperature range of 500 to 800° C. The reformed process gas 205 is heated in heat exchanger 206 and is fed by conduit 207 to the anode side 23 of the solid oxide fuel cell SOFC 2. The anode off-gas 208 leaving the solid oxide fuel cell 2 is cooled in heat exchanger 209 to for example about 300° C., and is first fed by conduit 210 into a high temperature water gas shift reactor 8, is then cooled in a heat exchanger 214, and is then fed into a low temperature water gas shift membrane reactor 4. The gas entering the low temperature water gas shift membrane reactor 4 is depleted of hydrogen 213 so that carbon dioxide rich gas stream 211 results. The carbon dioxide rich gas stream 211 leaving the low temperature water gas shift membrane reactor 4 is cooled in heat exchanger 212 and is fed to a CO2 conditioning unit 5, which at least separates water 411 from the carbon dioxide rich gas stream 211 and preferably compresses the gas stream to create a compressed carbon dioxide 435.

The solid oxide fuel cell 2 also comprises a cathode side 21 as well as an electrolyte 22. The solid oxide fuel cell 2 keeps the air stream 100 and the reformed process gas 205 separated, so that they do not mix. No further details of the solid oxide fuel cell 2 are shown. Air 100 is slightly compressed in blower 101 to compressed cold air 102, is heated in heat exchanger 103 to pre-heated air 104 and is then fed to the cathode side 21 of the solid oxide fuel cell 2. A hot depleted air stream 114 leaving the cathode side 21 of the solid oxide fuel cell 2 is cooled in heat exchanger 106, and is vented as depleted air 107. Electricity produced by the solid oxide fuel cell 2 is converted from DC to AC in inverter 6.

The embodiment disclosed in FIG. 1 is preferably suitable for a planar type solid oxide fuel cell SOFC 2. Most preferably neither the air 100 nor the reformate 205 is compressed, so that the pre-heated air 104 on the cathode side 21 and the reformate 205 on the anode side 23 have atmospheric pressure or nearly atmospheric pressure.

Instead of natural gas 215 or biogas, also a liquid carbonaceous fuel feed may be used, which may be introduced into a heat exchanger 203, preferably an evaporator, so that a gaseous carbonaceous fuel feed is leaving the evaporator and fed into the reformer 3.

Figure 2:
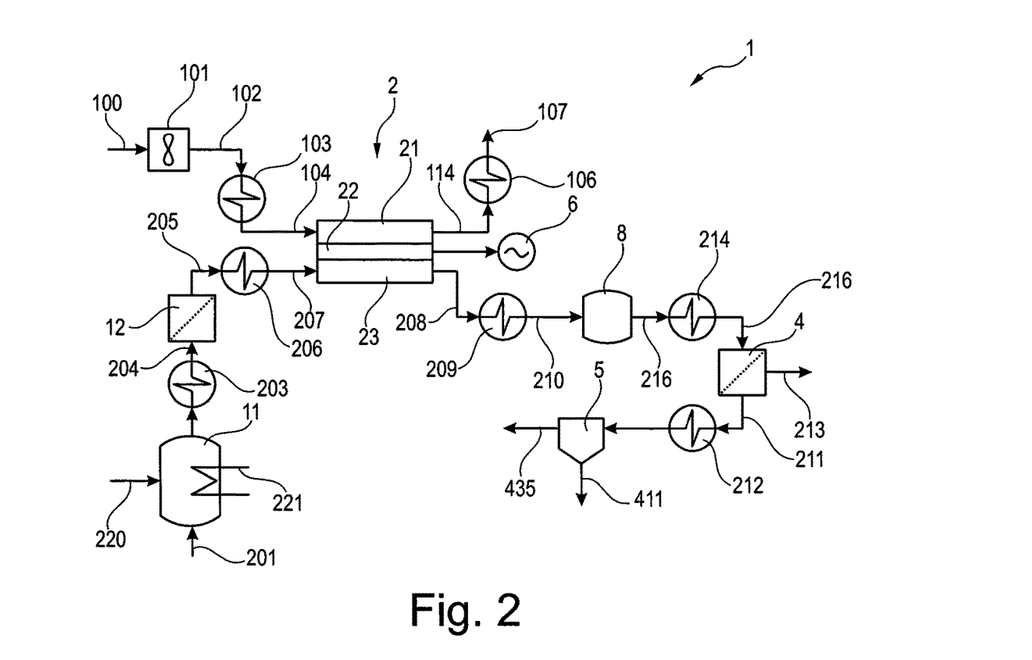
FIG. 2 shows a process flow diagram of a second embodiment of the invention.
Figure 3:
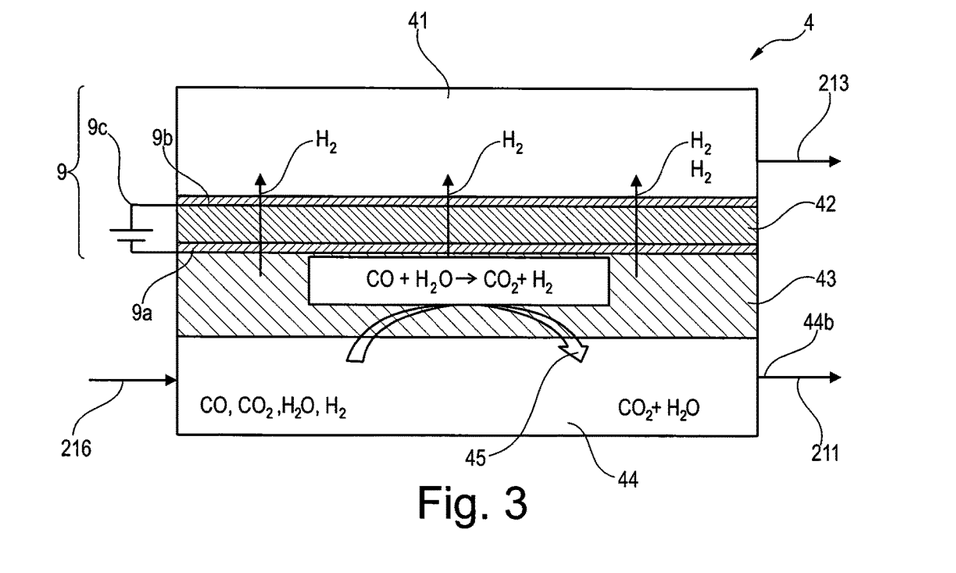
FIG. 3 shows a low temperature water gas shift membrane reactor.
Figure 5:
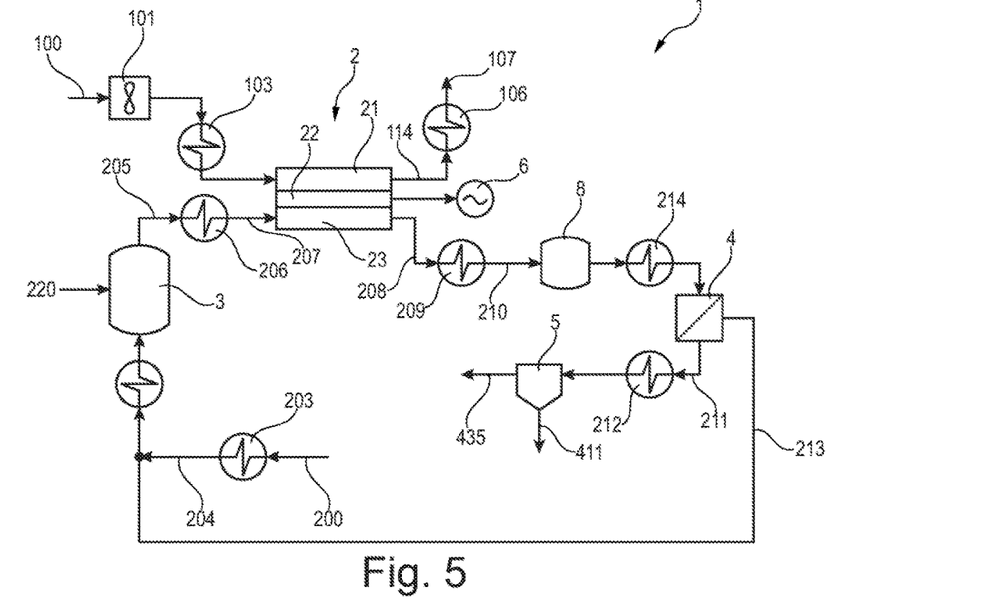
FIG. 5 shows a process flow diagram of a third embodiment of the invention.

FIG. 3 schematically shows a low temperature water gas shift membrane reactor 4 as it is used in the embodiments according to FIGS. 1, 2 and 5. The low temperature water gas shift membrane reactor 4 comprises a feed side 44 with exit 44*b* and a permeate side 41. Both sides are separated by a hydrogen pump 9 which comprises a membrane 42. The feed side 44 comprises a catalyst 43, respectively a catalyst bed, so that the water gas shift reaction 45 may take place, as indicated in FIG. 3. The anode off-gas 208, respectively the gas 216 exiting the high temperature water gas shift reactor 8 typically consisting of CO, $CO_2$, $H_2O$ and $H_2$ enters the feed side 44 of the water gas shift membrane reactor 4, where a separation process takes place, where the main aim is to convert CO to $CO_2$ and separate the $CO_2$ and $H_2O$ from the unspent fuel. $H_2$ is passing the membrane 42 and enters the permeate side 41. $CO_2$ and $H_2O$ is leaving the feed side 44 of the water gas shift membrane reactor 4 as a carbon dioxide rich gas stream 211 comprising mainly carbon dioxide 435 and steam. The hydrogen is leaving the permeate side 41 as a stream of purified hydrogen 213.

Figure 4:
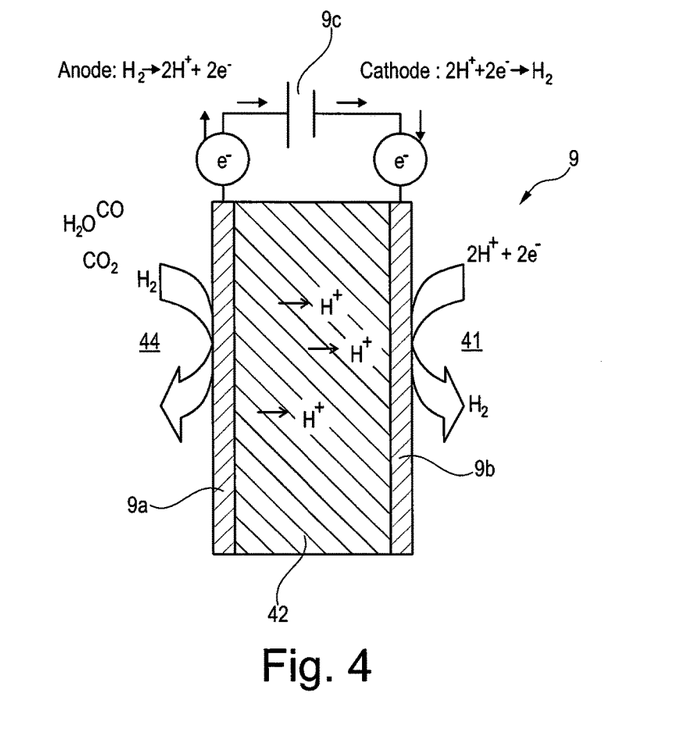
FIG. 4 schematically shows an electrochemical pump.

The hydrogen pump 9 comprising a first electrode layer 9*a*, a second electrode layer 9*b*, a membrane 42 there between, and comprising an electric power source 9*c* is disclosed in more details in FIG. 4.

FIG. 4 schematically shows a hydrogen pump 9 comprising a proton exchange membrane (PEM) 42. The electrochemical pump 9 is designed to oxidize and reduce hydrogen at the anode and cathode, respectively in an electrolysis mode. As disclosed in FIGS. 3 and 4, the hydrogen containing stream 216 enters the feed side 44 on the anodic compartment of the hydrogen pump 9, and molecular hydrogen is oxidized at the anode 9*a* to protons and electrons at the three-phase interface of the catalyst, electrolyte, and gas. The protons are then driven through the membrane 42 for the applied potential difference between the two electrodes 9*a*, 9*b*, while the electrons are driven through the electrically conductive elements of the cell through an external electrical circuit 9*c* to the cathode 9*b*. The protons and electrons are combined to form molecular hydrogen on the permeate side 41, so that pure hydrogen is released on the permeate side 41. The hydrogen pump 9 is operated in an electrolysis mode. Thus, the electrochemical pump 9 requires a power source 9*c* to complete the chemical reactions.

Preferably platinum is used as the catalyst in the hydrogen pump 9. Such a hydrogen pump 9 is capable of separating hydrogen as long as the gas constituents of the input gas 216 do not poison the catalyst or diffuse through the membrane 42. One such undesirable impurity is carbon monoxide as it adsorbs onto the catalyst surface and inhibits its electrochemical activity. Therefore it is important to keep the CO levels lower than 2%. Therefore it is important to convert carbon monoxide and steam contained in the anode off-gas 208 in the high temperature water-gas shift reactor into carbon dioxide and hydrogen, before the gas 216 exiting the high temperature water-gas shift reactor 8 is fed into the low temperature water-gas shift membrane reactor 4. This combination of two consecutive water gas shift reactors 4,8 allows to keep the CO level in the low temperature water-gas shift reactor 4 at a low level, and therefore allows using a hydrogen pump 9 in the low temperature water-gas shift membrane reactor 4.

In a preferred embodiment the membrane 42 of the hydrogen pump 9 is of Polybenzimidazole (PBI) doped with phosphoric acid (PA). Such membranes have been shown to operate at temperatures of up to 200° C. Therefore a hydrogen pump 9 comprising such a membrane 42 is in particular preferred in combination with the low temperature water-gas shift membrane reactor 4.

The low temperature water gas shift membrane reactor 4 comprises a water-gas-shift reactor in combination with a hydrogen pump 9 comprising a PA-doped PBI membrane 42, so that the water gas shift membrane reactor 4 combines a water-gas-shift catalyst with a $H_2$ separation membrane. The function of the hydrogen pump 9 is to remove $H_2$ from the feed side 44 and thereby displace the equilibrium of reaction ($CO+H_2O=CO_2+H_2$) towards the reaction products. This enables to obtain a gas mixture at the exit of the feed side 44 comprising mainly steam and $CO_2$. The remaining consists of traces of $CH_4$, CO and $H_2$. The separation membrane 42 should preferably operate at the same temperature as the water-gas-shift reactor.

The conversion of carbon monoxide into carbon dioxide preferably reaches more than 95%. This may be achieved by controlling the temperature of the water gas shift membrane reactor 4 and/or the electric power 9*c* or rather the $H_2$ pumping rate.

FIG. 2 shows a further embodiment. In contrast to the embodiment disclosed in FIG. 1, a solid carbonaceous fuel 201, for example wood, in combination with steam 220 is fed into a gasifier 11, to generate a product gas. The product gas is then cooled in heat exchanger 203 and fed as gas stream 204 into a gas cleaning unit 12, so that a reformed process gas 205 is produced, suitable to be fed to the solid oxide fuel cell 2. A heat exchanger 221 may be used in the gasifier 11. Various solid carbonaceous fuels may be used in the system 1, for example wood, biomass or coal. Depending on the type of fuel the gasifier 11 has to be adapted, to generate an appropriate product gas, which after passing the gas cleaning unit 12 may serve as a reformed process gas feed 205, suitable to be fed into the solid oxide fuel cell 2. If liquid or gaseous carbonaceous fuels are used, no gasifier 11 is necessary, so that in the embodiment disclosed in FIG. 2, such carbonaceous fuels can be directly fed into the gas cleaning unit 12, or in the embodiment according to FIG. 1, the carbonaceous fuel can be fed into the fuel pretreatment unit 13. If waste-derived fuels are used, such a cleaning unit 12 or a pretreatment unit 13 is most important, because waste-derived fuels contain a variety of trace contaminants. The amount and speciation of such trace contaminants depends on various factors, such as the type and age of waste, temperature and pressure, and the stage of the decomposition process. While many contaminant species are present in biogas, the following three classes of impurities are of particular concern when used in fuel cells systems: sulfur, siloxanes, and VOCs (volatile organic compounds). At least these impurities should be removed in the pretreatment unit 13 or the gas cleaning unit 12. SOFC systems in particular require very stringent acid gas removal because they can only tolerate about 1 ppm $H_2S$ and about 1 ppm halides in the fuel gases.

FIG. 5 shows a process flow diagram of a third embodiment of the invention. In contrast to the embodiment according to FIG. 1, the purified hydrogen 213 and the carbonaceous fuel feed 200 or gaseous hydrocarbon feed 200 are combined and then fed to reformer 3.

Figure 6:
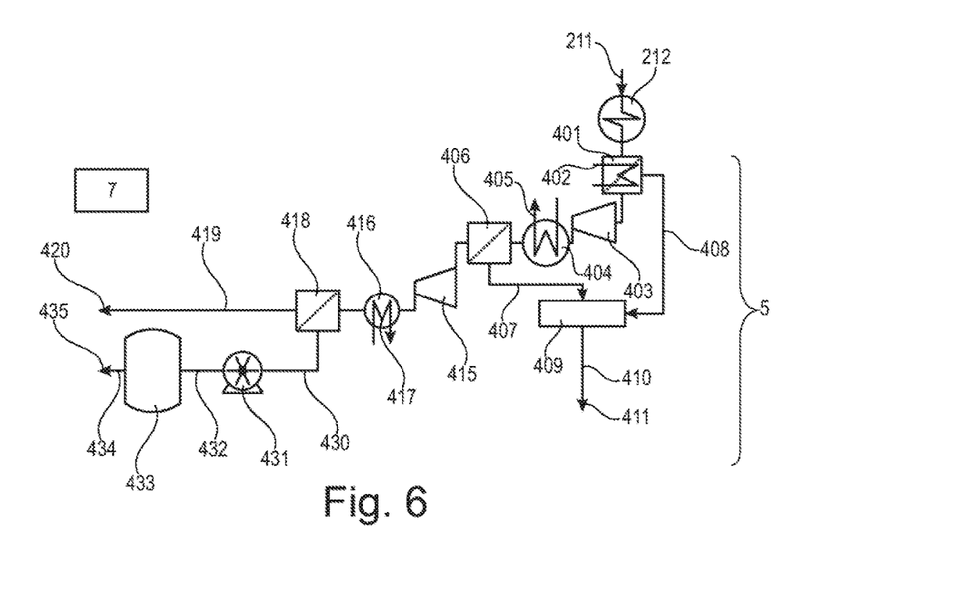
FIG. 6 shows a separation system to separate carbon dioxide.

FIG. 6 shows an embodiment of a $CO_2$ conditioning unit 5. The carbon dioxide rich gas stream 211 is routed to a conditioning unit 5 consisting of a series of compression and cooling steps to separate at least water and carbon dioxide and residual gases. The carbon dioxide rich gas stream 211 is cooled in heat exchanger 212 and thereafter enters a water separator 401 with auxiliary cooling 402, wherein water condensate 408 is separated. The remaining cooled carbon dioxide rich gas stream 211 is then compressed in a compressor 403, cooled in a heat exchanger 404 with auxiliary cooling 405 and then introduced in a further water separator 406, wherein water condensate 407 is separated. The separated water 407, 408 is collected in a water tank 409 and the water 411 may be available at a water outlet 410. The remaining cooled carbon dioxide rich gas stream 211 is compressed in a compressor 415, cooled in a heat exchanger 416 with auxiliary cooling 417 and flowing in an optional separator 418, wherein the fluid is separated into a residual gas 420, which may be available at a compressed residual gas outlet 419, and into a supercritical carbon dioxide 430, which by a pump 431 and conduit 432 is pumped into a carbon dioxide storage tank 433. The compressed carbon dioxide 435 may be available at a carbon dioxide outlet 434. By way of example, the cooled carbon dioxide rich gas stream 211 may have a pressure of 10 bar when leaving the compressor 403, and may have a pressure of 80 bar when leaving the compressor 415, so that the residual gases 420 have a pressure of 80 bar, whereby the carbon dioxide is further compressed by pump 431, so that the compressed carbon dioxide 435 may have a pressure of 150 bar. FIG. 6 also shows a control unit 7 to control the system 1 and or the conditioning unit 5. All systems disclosed in FIGS. 1, 2, 5 and 6 comprise a control unit 7 which allows control of the solid oxide fuel cell SOFC 2 such that a fuel utilization (FU) in the range of 0% to 90%, in particular in the range of 25% to 80% is achieved. For a power balance, which means for self-sufficiency in terms of electrical power, a fuel utilization (FU) of 25% would preferably be the minimum. The control unit 7 allows to control the amount of purified hydrogen 213 and carbon dioxide 435 produced by the system 1, in particular by controlling the fuel utilization (FU) of the solid oxide fuel cell SOFC 2.

Figure 7:
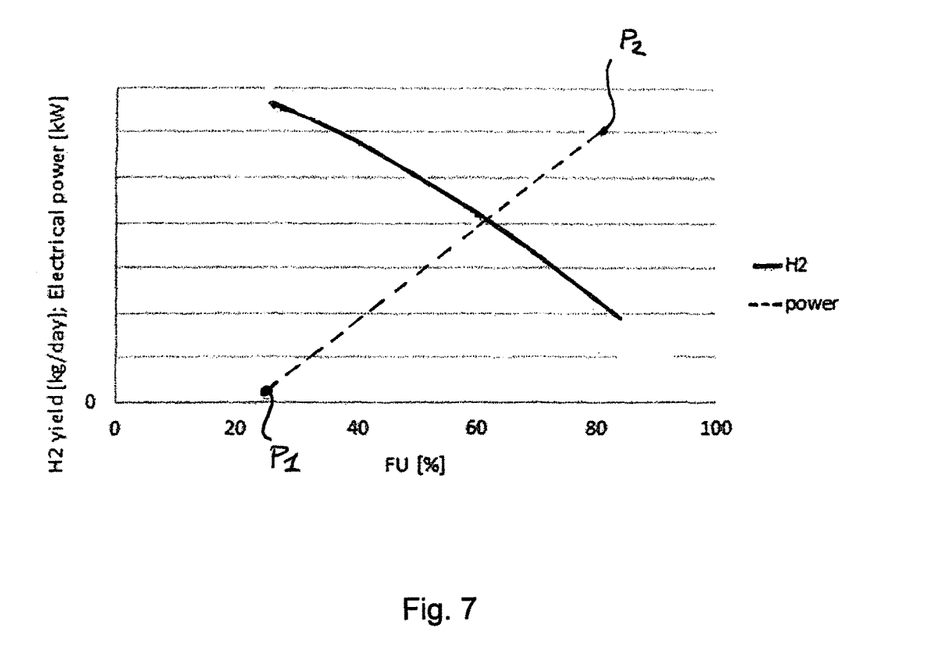
FIG. 7 shows an example of the amount of power and hydrogen generated, depending on the fuel utilization FU.

FIG. 7 shows by way of example the amount of power and hydrogen generated, depending on the fuel utilization FU. Assuming the reformed process gas feed 205 continuously delivers energy in the amount of X kW. The produced amount of carbon dioxide is a constant amount of Y kg/day. Then the modulation of the power, produced by the solid oxide fuel cell SOFC 2, and indicated in FIG. 7 by the line "power" between the power P1 and P2, leads to a production of hydrogen [kg/day] as disclosed by the line "H2" in FIG. 7. Therefore, FIG. 7 shows in an example the effect of the amount of fuel utilization (FU) versus the production of hydrogen. As disclosed in FIG. 7, the fuel utilization (FU) may most preferably be modulated within a range of about 25% to 80%.

The invention claimed is:

1. A method for producing carbon dioxide, purified hydrogen and electricity from a reformed process gas feed using a solid oxide fuel cell SOFC, the method comprising the steps of:
introducing the reformed process gas into an anode side of the solid oxide fuel cell;
in the solid oxide fuel cell, introducing air into a cathode side of the solid oxide fuel cell and in the anode side converting hydrogen and carbon monoxide of the reformed process gas in combination with oxygen into an anode off-gas comprising steam, carbon dioxide and unconverted process gas;
wherein:
introducing the anode off-gas into a high temperature water gas shift reactor;
in the high temperature water-gas shift reactor, converting carbon monoxide and steam into carbon dioxide and hydrogen,
introducing the gas exiting the high temperature water-gas shift reactor into a low temperature water-gas shift membrane reactor, and
in the low temperature water-gas shift membrane reactor, converting carbon monoxide and steam into carbon dioxide and hydrogen, whereby the low temperature water-gas shift membrane reactor comprises a hydrogen pump that produces purified hydrogen on a permeate side which is supplied to a purified hydrogen outlet, while removing hydrogen from a feed side, so that the anode off-gas is depleted of hydrogen and carbon monoxide to create a carbon dioxide rich gas stream comprising mainly carbon dioxide and steam;
wherein the solid oxide fuel cell SOFC is controlled to operate with a fuel utilization (FU) in the range of 0% to 90%, depending on a demanded amount of purified hydrogen and carbon dioxide to be produced.

2. The method of claim 1, wherein the solid oxide fuel cell SOFC is controlled to operate with a fuel utilization (FU) in the range of 25% to 80%.

3. The method of claim 1, wherein the gas exiting the high temperature water-gas shift reactor contains less than 2% carbon monoxide and has a temperature of less than 200° C.

4. The method of claim 1, wherein a gaseous carbonaceous fuel feed and steam is introduced into a reformer; and
wherein in the reformer the reformed process gas is generated by at least partially converting methane and steam into carbon monoxide and hydrogen.

5. The method of claim 4, wherein a liquid carbonaceous fuel feed is introduced into a heat exchanger to generate the gaseous hydrocarbon feed.

6. The method of claim 1, wherein a solid carbonaceous fuel and steam is introduced into a gasifier, to generate a product gas, and wherein the product gas is introduced into a gas cleaning unit to generate the reformed process gas.

7. The method of claim 1, wherein the purified hydrogen is added to the reformed process gas feed.

8. The method of claim 1, wherein the carbon dioxide rich gas stream is introduced into a separation system;
in the separation system, separating steam from the carbon dioxide rich gas stream, wherein the carbon dioxide is compressed in a compressor and a pump to provide a compressed carbon dioxide.

9. The method of claim 1, controlling the produced amount of purified hydrogen and carbon dioxide by lowering the fuel utilization (FU) such, that the electrical power produced by the solid oxide fuel cell SOFC allows self-sufficient operating of the method.

10. A system for producing carbon dioxide, purified hydrogen and electricity from a reformed process gas feed, the system comprising a solid oxide fuel cell SOFC, comprising:
a solid oxide fuel cell is fluidly connected with a reformed process gas feed for converting the reformed process gas in combination with oxygen into an anode off-gas comprising steam, carbon dioxide and unconverted process gas;
a water gas shift reactor and an electrochemical pump are fluidly connected with the solid oxide fuel cell for receiving the anode off-gas, and
a control unit;

wherein a water gas shift reactor comprises a high temperature water-gas shift reactor, and a low temperature water-gas shift membrane reactor comprising a permeate side, a feed side, and the electrochemical pump there between, wherein the high temperature water-gas shift reactor is fluidly connected with the solid oxide fuel cell for receiving the anode off-gas, and for converting carbon monoxide and steam into carbon dioxide and hydrogen, wherein the feed side of the low temperature water-gas shift membrane reactor is fluidly connected with the high temperature water gas shift reactor for receiving the gas exiting the high temperature water-gas shift reactor, and for converting carbon monoxide and steam into carbon dioxide and hydrogen, and for separating the hydrogen by the electrochemical pump to create an output for purified hydrogen on the permeate side, so that the anode off-gas is depleted of hydrogen and carbon monoxide to create a carbon dioxide rich gas stream comprising mainly carbon dioxide and steam;

wherein the control unit is adapted to control the fuel utilization (FU) of the solid oxide fuel cell, to thereby control the produced amount of purified hydrogen and carbon dioxide, wherein the control unit is adapted to control the fuel utilization (FU) in the range of 0% to 90%, depending on a demanded amount of purified hydrogen and carbon dioxide to be produced.

11. The system of claim 10, wherein the control unit is adapted to control the fuel utilization in the range of 25% to 80%.

12. The system of claim 10, wherein the exit of the permeate side of the low temperature water gas shift membrane reactor is fluidly connected with the reformer.

13. The system of claim 10, wherein the electrochemical pump comprises a PEM membrane for selectively removing hydrogen.

14. The system of claim 10, comprising a reformer for receiving a gaseous carbonaceous fuel feed and steam, wherein the reformer is fluidly connected with the solid oxide fuel cell for providing the reformed process gas.

15. The system of claim 14, comprising an evaporator for receiving a liquid carbonaceous fuel feed and for generating the gaseous carbonaceous feed, in particular the gaseous hydrocarbon feed, wherein the evaporator is fluidly connected with the reformer.

16. The system of claim 10, comprising a gasifier for receiving a solid carbonaceous fuel and steam, wherein the gasifier is fluidly connected with a gas cleaning unit for generating the reformed process gas, and wherein the gasifier is fluidly connected with the solid oxide fuel cell.

17. The system of claim 10, wherein a separation system is fluidly connected with the exit side of the feed side of the low temperature water-gas shift membrane reactor, to introduce the carbon dioxide rich gas stream into the separation system to separate steam from the carbon dioxide rich gas stream to provide the carbon dioxide.

18. The method of claim 4, wherein a gaseous carbonaceous fuel feed comprises a gaseous hydrocarbon.

19. The method of claim 18, wherein a liquid carbonaceous fuel feed comprises a liquid hydrocarbon.

20. The method of claim 14, wherein the gaseous carbonaceous fuel feed comprises a gaseous hydrocarbon.

21. The method of claim 20, wherein the gaseous carbonaceous fuel feed comprises a gaseous hydrocarbon.

* * * * *